March 2, 1965 L. FREIMANIS 3,171,985

TRANSISTOR PULSE STRETCHING CIRCUIT TIMED BY AN L-C RINGING CIRCUIT

Filed Dec. 20, 1962

INVENTOR
L. FREIMANIS
BY Ray M. Porter, Jr.
ATTORNEY

United States Patent Office 3,171,985
Patented Mar. 2, 1965

3,171,985

TRANSISTOR PULSE STRETCHING CIRCUIT TIMED BY AN L-C RINGING CIRCUIT

Laimons Freimanis, East Orange, N.J., assignor to Bell Telephone Laboratories, Incorporated, New York, N.Y., a corporation of New York Filed Dec. 20, 1962, Ser. No. 246,039
3 Claims. (Cl. 307—88.5)

Figure 1:
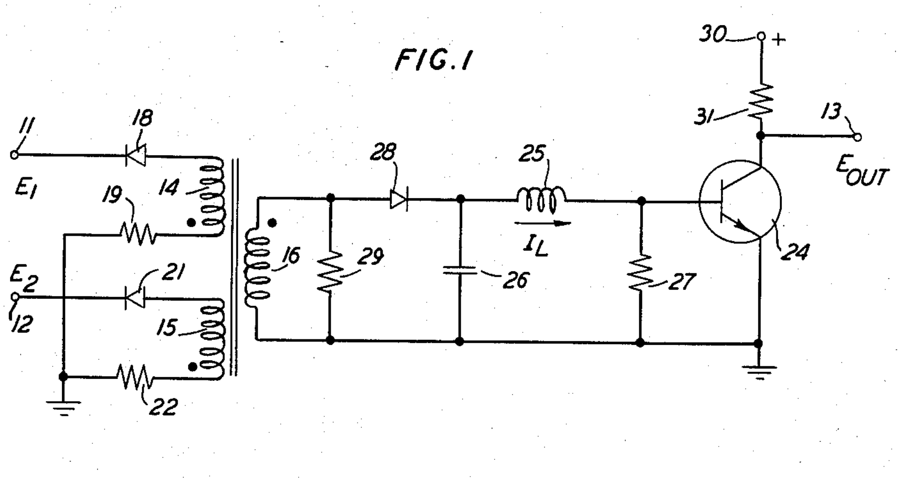

The present invention relates to electrical waveform generators and more particularly to apparatus for generating pulses of the type employed in digital information handling systems.

It is a general object of the present invention to produce electrical pulses of precise time position and duration.

Perhaps the most common method of generating timed pulses involves the use of an R–C or R–L time reference network and a comparator. In these prior art arrangements, an initiating signal starts the generation of a monotonic time-base waveform by applying a reference potential to the resistance-reactance network. At the instant the waveform attains a predetermined threshold level, the comparator indicates the termination of the time interval.

These prior art systems, while satisfactory in many applications, suffer at least two significant disadvantages. First, the accuracy of the measured time interval is dependent upon the values of the components in the time reference network. Resistance aging, which often causes a substantial change in the value of a resistor over a period of years, is thus quite detrimental, particularly in those appications where the timed-pulse generator is required to perform for an extended period without adjustment. Secondly, such prior art arrangements, in order to achieve precise time-interval measurement, must be provided with a reference voltage and a threshold level of highly constant magnitude. As may be appreciated, the dependence of accuracy upon component values and upon reference voltage levels is even more troublesome when such timed-pulse generators are operated in an environment of changing temperatures.

Accordingly, it is a further object of the present invention to generate timed pulses in a manner which requires neither precision resistors nor accurate reference voltage levels.

In a principal aspect, the present invention takes the form of a "pulse-stretching" circuit which employs an LC ringing network for delivering an output pulse having a precise time-duration between zero-crossings. In accordance with a principal feature of the invention, the base-emitter path of a transistor is connected in series with the ringing network inductance. In operation, an input pulse charges the ringing network capacitor to some arbitrary initial value. A half-sinusoid of "discharge" current then flows from the capacitor through the inductor and the base-emitter path of the transistor, turning the transistor On. According to the invention, at the end of the first half-cycle when the direction of current flow starts to reverse, the base-emitter junction of the transistor becomes back-biased and the reverse current is forced to flow through a damping resistor. In accordance with a further feature of the invention, this damping resistor possesses a sufficiently high resistance to insure that the ringing current is completely damped during the second half-cycle, thus preventing the transistor from turning On again until another initiating pulse appears.

In a further embodiment of the invention, the above-described pulse stretching circuit is interconnected with a second pulse generating device to provide a novel "delayed pulse" generator. In this embodiment of the invention, the output pulse appears at the end of a precise delay period following the application of the initiating input pulse.

Figure 2:
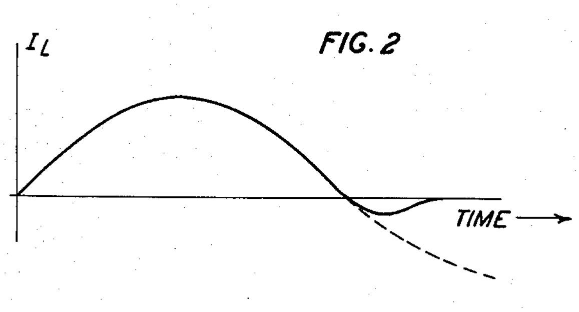
Figure 3:
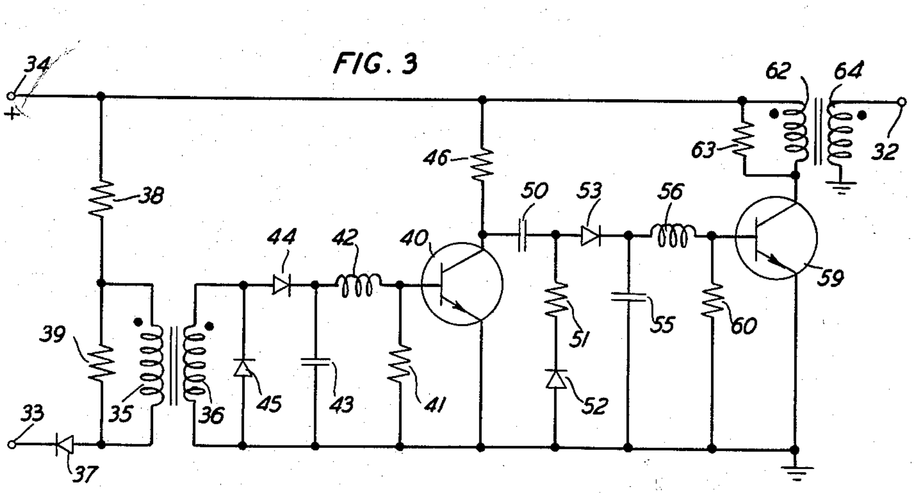

These and other features, objects and advantages of the present invention will become more apparent following a consideration of the following detailed description and drawings of two embodiments of the invention. In the drawings:

FIG. 1 schematically illustrates a "pulse-stretching" circuit of the type contemplated by the present invention;

FIG. 2 shows the waveform of the current which flows through the inductance 25 during the operation of the circuit of FIG. 1; and FIG. 3 is a schematic drawing of a delayed pulse generator according to the invention.

The circuit shown in FIG. 1 of the drawings accepts pulses at its two input terminals 11 and 12 and delivers an output pulse of precise time-duration to the terminal 13. The pulse stretching network is provided with a conventional OR gate input circuit. This input arrangement includes a transformer having primary windings 14 and 15 and a secondary winding 16. A diode 18 is serially connected with the primary winding 14 and a resistance 19 between the input terminal 11 and ground. A similar configuration comprising the serial connection of a diode 21, primary winding 15 and a resistance 22 connects input terminal 12 to ground. The diodes 18 and 21 are poled such that currents are allowed to flow through the primary windings 14 and 15 only when negative-going impulses are applied to the input terminals. This input circuit is called an OR gate because pulses applied to either input terminal 11 or input terminal 12 cause an impulse of voltage to appear across the secondary winding 16. The diodes are not essential, of course, but do become useful when it is desired to prevent interaction between the connected driving circuits.

The pulse stretching circuit includes a transistor 24, an LC ringing circuit which is made up of inductance 25 and capacitor 26, and a damping resistor 27. A diode 28 is connected in series with the capacitor 26 across the secondary winding 16. A resistance 29 is also connected in parallel with the secondary winding 16. The inductor 25 connects the base electrode of transistor 24 to the junction of diode 28 and capacitor 26. A damping resistance 27 is connected between the base electrode of transistor 24 and the grounded emitter electrode. A source of a positive potential is connected to the terminal 30 to supply an operating potential for the transistor 24. A resistance 31 connects terminal 30 to the collector of transistor 24. An output terminal 13 is directly connected to the collector of transistor 24.

In order to more clearly understand the operation of the pulse stretching circuit pictured in FIG. 1 of the drawings, it will be helpful to consider the waveform shown in FIG. 2. Whenever a negative-going input pulse is applied to either input terminals 11 ar 12, a positive impulse appears across secondary winding 16. This positive pulse of voltage rapidly charges the capacitor 26 through diode 28 to some arbitrary initial value. The capacitor 26 then begins to discharge through the inductor 25 and the forward-biased base-emitter junction of transistor 24. Since the base-emitter path presents a small impedance to the flow of current in this direction, the waveshape of the current flowing through inductor 25 is substantially like that of a half-sinusoid as shown in FIG. 2. Current continues to flow through the inductor 25 charging capacitor 26 with a voltage of the opposite polarity. As soon as this voltage reaches a sufficient magnitude, the direction of current flow starts to reverse and the base-emitter junction of transistor 24 becomes back-biased. The current is then forced to flow through the damping resistance 27. This damping resistance possesses sufficient impedance to substantially suppress the flow of further oscillatory currents in the ringing circuit. As will be appreciated, the transistor 24 is turned On for a precise time-duration approximately equal to one-half the period of resonance of the LC ringing circuit. (While the "On-time" of transistor 24 is accurately determined, it is not exactly equal to half the period of resonance because the turn-on and turn-off times of the transistor must be taken into account.) The output terminal 13, which is normally at a positive potential, is quickly connected to ground whenever transistor 24 is On—thus receiving a negative-going pulse of precise time duration. Because of the transformer 16, the driving circuit for transistor 24 is "floating" and the transistor might be interconnected with any number of other circuits as desired. It should be noted that the length of time transistor 24 conducts is determined solely by the capacitor 26 and the inductor 25 and that normal variations in the magnitude of the supply voltage or the input pulse do not appreciably affect the operation of the circuit.

The embodiment of the invention shown in FIG. 3 of the drawings delivers an output pulse to terminal 32 which possesses a precise time duration and which is delayed from the application of an input pulse to terminal 33 by an accurately determined time interval. The delayed pulse generator shown in FIG. 3 is provided with a terminal 34 which is connected to a source of a positive operating potential. The input circuit to the delayed pulse generator of FIG. 3 includes a transformer having a primary winding 35 and a secondary winding 36. The primary winding 35 is connected in series with a resistance 38 and a diode 37 between the positive supply terminal 34 and input terminal 33. A resistance 39 is connected in parallel with the primary winding 35. The input arrangement delivers a positive impulse across secondary winding 36 whenever input terminal 33 is momentarily grounded. This positive impulse is applied to a pulse stretching circuit which comprises a transistor 40, a damping resistance 41, an inductor 42, a capacitor 43 and a diode 44, all of which are connected in a configuration similar to that described in connection with FIG. 1. A "fly-back" diode 45 is connected in parallel with the primary winding 36 to provide a shunting path for back-voltages which may appear across the winding 36. A positive operating potential is supplied to the collector of transistor 40 from terminal 34 by means of the resistance 46. That portion of the delayed pulse generator shown in FIG. 3 which has thus far been described, operates in a manner similar to the operation of FIG. 1; that is, whenever input terminal 33 is momentarily grounded, the collector of transistor 40 is connected to ground for a precise time interval.

The series combination of a capacitor 50, a resistance 51 and a diode 52 are connected between the normally positive collector of transistor 40 and ground. A diode 53 connects the junction of capacitor 50 and resistance 51 to the junction of a capacitor 55 and an inductor 56 which form the LC ringing circuit of a second pulse stretching arrangement. This pulse stretching circuit also includes the transistor 59 and a damping resistance 60. The primary winding 62 of an output transformer connects the collector of transistor 59 to the positive supply terminal 34. A resistor 63 is connected in parallel with the primary winding 62. The output transformer is provided with a secondary winding 64 which is connected between output terminal 32 and ground.

Before an input pulse is applied, the capacitor 50 is fully charged by the potential applied to terminal 34 through the path comprising resistance 46, diode 53, inductance 56, and resistor 60. It will be remembered that whenever input terminal 33 is momentarily grounded, the transistor 40 conducts for a fixed period of time. During the time that transistor 40 is turned On, the capacitor 50 is allowed to partially discharge through the path comprising transistor 40, diode 52, and resistor 51. As soon as transistor 40 turns Off, its collector again rises to a positive potential and capacitor 50, having been partially discharged, rapidly recharges through the path comprising resistance 46, diode 53 and capacitor 55. Thus, capacitor 55 rapidly charges to some arbitrary initial value. Accordingly, the capacitor 55 then discharges through inductor 56 and the base-emitter path of transistor 59 to turn On the transistor 59 for a fixed period of time. As will be readily appreciated, the time duration between the moment when input 33 was grounded and the leading edge of the output pulse delivered to terminal 32 is determined by the resonant frequency of the ringing circuit which comprises capacitor 43 and inductance 42. The time duration of the output pulse, on the other hand, is determined by the resonant frequency of the ringing circuit comprising capacitor 55 and inductance 56. It should be noted that the value of the resistors employed in the delayed pulse generator of FIG. 3 and the pulse stretching of FIG. 1 are not critical. The values of these resistors, as well as the magnitude of the supplied operating potentials, may change over a substantial range of values without significantly affecting the operation of the circuits.

The embodiments which have been described are, of course, merely illustrative of the principles of the present invention. It will be apparent to those skilled in the art that numerous modifications may be made to these embodiments without departing from the true spirit and scope of the invention.

What is claimed is:

1. In combination, first and second transistors each having a control current path and a transconductive path, a first capacitor and a first inductor serially connected with the control current path of said first transistor, means for charging said first capacitor to an initial potential of appropriate polarity to allow said first capacitor thereafter to discharge through a path including said first inductor and said control current path of said first transistor, a second capacitor arranged to be discharged whenever said transconductive path of said first transistor becomes conductive, a third capacitor, a source of a charging potential connected to charge both said second and said third capacitors whenever said transconductive path of said first transistor becomes nonconductive, a second inductor serially connected with said third capacitor and said control current path of said second transistor whereby the transconductive path of said second transistor becomes conductive during the period in which said third capacitor is being discharged.

2. Apparatus as set forth in claim 1 wherein a first damping resistance is connected in parallel with the control current path of said first transistor and a second damping resistance is connected in parallel with the control current path of said second transistor.

3. In combination, a transistor having base, emitter and collector regions, a capacitor and an inductor connected in series between said base and said emitter regions, a source of an input pulse, circuit means for applying said input pulse to said capacitor to charge said capacitor to an initial potential, said circuit means including a serially connected diode poled in a direction to thereafter prevent the discharge of said capacitor through said circuit means, said initial potential being of appropriate polarity to allow said capacitor to discharge one half-cycle of oscillatory current through a path comprising said inductor and the junction of said base and emitter regions, means including a damping resistance connected in parallel with said junction for suppressing the flow of further oscillatory currents following said one half-cycle, and a source of an operating potential and an output circuit connected in series between said emitter and collector regions whereby said output circuit is energized during said one half-cycle of oscillatory current.

References Cited in the file of this patent

UNITED STATES PATENTS

| | | |
|---|---|---|
| 2,878,382 | Creveling | Mar. 17, 1959 |
| 3,098,937 | Martens | July 23, 1963 |